(No Model.)

G. A. DAVIDSON.
STONE SAWING MACHINE.

No. 409,774. Patented Aug. 27, 1889.

Witnesses:
S. B. Brewer
H. V. Scattergood

Inventor:
George A. Davidson
by William H. Low,
Attorney.

UNITED STATES PATENT OFFICE.

GEORGE A. DAVIDSON, OF MALDEN, ASSIGNOR OF ONE-HALF TO HORACE T. CASWELL, OF TROY, NEW YORK.

STONE-SAWING MACHINE.

SPECIFICATION forming part of Letters Patent No. 409,774, dated August 27, 1889.

Application filed March 8, 1887. Serial No. 230,133. (No model.)

*To all whom it may concern:*

Be it known that I, GEORGE A. DAVIDSON, of Malden, in the county of Ulster and State of New York, have invented new and useful Improvements in Stone-Sawing Machines, of which the following is a specification.

My invention relates to improvements in machinery for sawing stone, in which chilled shot or other suitable abrading material is used in conjunction with the cutting mechanism, and the object of my invention is to produce a machine that will perform its work in a very rapid and thorough manner. This object I attain by means of the mechanism illustrated in the accompanying drawings, which are herein referred to and form part of this specification, and in which—

Figure 1:
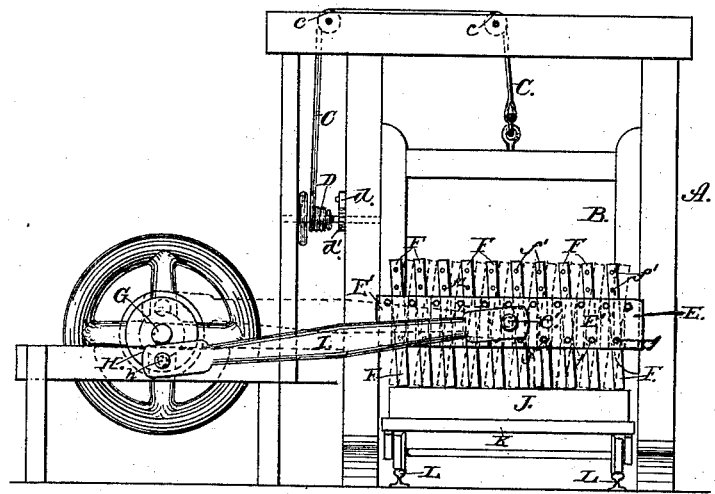
Figures 2, 4:
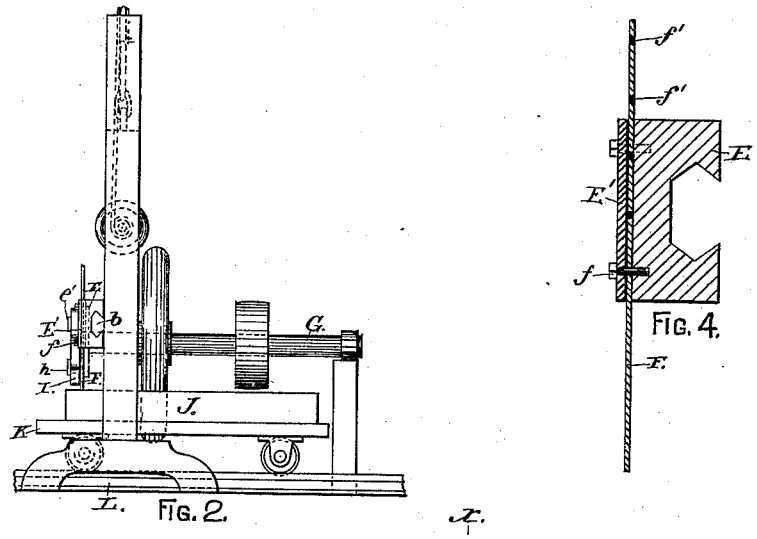
Figure 3:
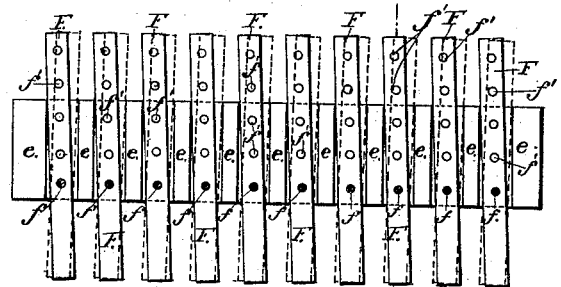

Figure 1 is a front elevation of a machine embodying my invention; Fig. 2, a side elevation of the same; Fig. 3, an enlarged and detached front elevation of the reciprocating cutter-head with its face-plate removed, and Fig. 4 an enlarged and detached transverse section of the reciprocating cutter-head, at the line $x$ $x$ on Fig. 3.

Simultaneously herewith I have filed another application, Serial No. 230,132, for a machine for sawing stone, which differs from this in the mode of attaching the cutters to the cutter-head.

As represented in the drawings, A is the frame-work of the machine, in which the sliding gate B is fitted to move up and down as occasion requires, and to facilitate this movement of said gate a windlass D is connected thereto by means of a chain or rope C, which runs over guide-sheaves $c$. Said gate has a horizontal guide $b$, on which a reciprocating cutter-head E is fitted to slide back and forth. The cutter-head E is provided with a series of oscillatory cutters F, which are made of flat bars of wrought-iron or other suitable metal of such thickness as may be required to produce the desired width of cut to be made. The cutters F project to a sufficient distance below the under side of the cutter-head E to enable them to pass entirely through the stone on which they are required to operate. Said cutters are pivoted to the cutter-head E by studs $f$, on which said cutters can swing edgewise to a distance that is limited by the space between the ribs $e$, said swinging movements being made in a direction that corresponds to the direction of movement of the cutter-head E and thereby the face of the lower end of each cutter will assume an angular position in respect to the bottom of the cut or kerf made by the cutters, wherein the advancing or cutting corner of the cutter will reach lower than the following corner or heel, and the relative conditions of these points will change with each reversal of the stroke of the cutter-head, as indicated by dotted lines in Fig. 1. By this action of the cutters the abrading material used will accumulate under the heel of each cutter, where it will be in the best place to render the most effective aid at the instant the direction of movement of the cutter-head is reversed, and at that instant the points that have before been the heels of the cutters become their cutting-edges. The cutters F are provided with a series of holes $f'$, in which the pivots $f$ fit, so as to permit the cutters to be adjusted to any required height in the cutter-head. Said cutters are held in place by the face-plate E', which is removably attached to the cutter-head. The driving-shaft G is provided with a crank H, and to the crank-pin $h$ of the latter the connected rod I is attached. The opposite end of said rod connects with the wrist-pin $e'$ on the face-plate E' of the cutter-head, and by the rotations of the driving-shaft G said cutter-head is reciprocated on the guide $b$.

The operation of my machine is as follows: The gate B is raised by the windlass D and held up by a pawl $d$, which engages with a ratchet-wheel $d'$, secured to the windlass-shaft. A stone J is fixed in place directly under the path of the cutter-head E, and to facilitate the moving of the stone I preferably place it on a car K, which is fitted to run on track-rails L. When the stone has been properly adjusted, the sliding gate B is lowered to let the lower ends of the cutters F bear upon the stone, where the combined weight of the sliding gate, cutter-head, and cutters, by resting on said cutters, aid in the operation of cutting. The abrading material and liquid are then spread on the top of the stone in the path of the cutters F, and the driving-shaft of the machine is then put in motion to reciprocate the cutter-head E, whereupon the cutters F, operating as hereinbefore described, produce a kerf that rapidly separates the stone into the parts required.

When preferred, the sliding gate B may be raised and lowered by means of a screw or racks and pinions or other suitable means instead of the windlass and chain hereinbefore described, and when either of these substitutes is employed the said gate may be fed down by a positive power instead of by gravity, as when the windlass and chain are used.

I claim as my invention—

1. In a stone-sawing machine whereby the operation of sawing is effected by the aid of loose abrading material, the combination of a vertically-sliding gate having a horizontal guide thereon and a reciprocating cutter-head fitted to slide on said guide and provided with a series of pendulous cutters pivoted to said cutter-head, said cutters being formed of parallel flat bars of metal, their vibrations in said cutter-head being limited by ribs formed on the latter, and the angular space formed under the lower end of the cutter at each change of direction of the movement of the cutter-head affording an opening for the abrading material to accumulate in preparatory to the next following change of direction, as and for the purpose herein specified.

2. In a stone-sawing machine, the combination of a reciprocating cutter-head and a series of pendulous cutters formed of parallel bars of metal and pivoted to said cutter-head, said cutters being vertically adjustable in said cutter-head independently of the up-and-down feeding movement of latter, as and for the purpose herein specified.

GEORGE A. DAVIDSON.

Witnesses:
TOMPKINS HOMMEL,
H. C. BOGARDUS.